F. J. GOLDKAMP.
DEVICE FOR THE MANUFACTURE OF HOLLOW OBJECTS.
APPLICATION FILED AUG. 25, 1908.
934,666.
Patented Sept. 21, 1909.
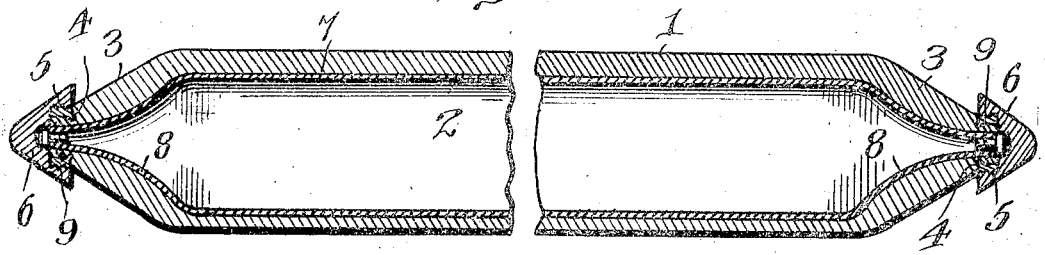
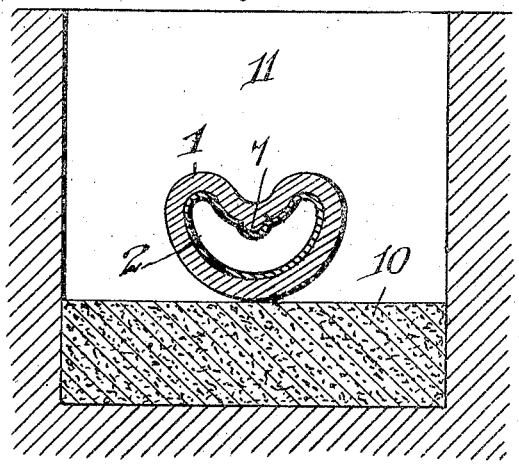
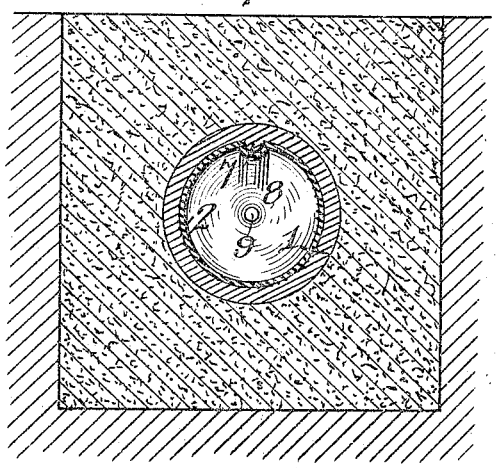
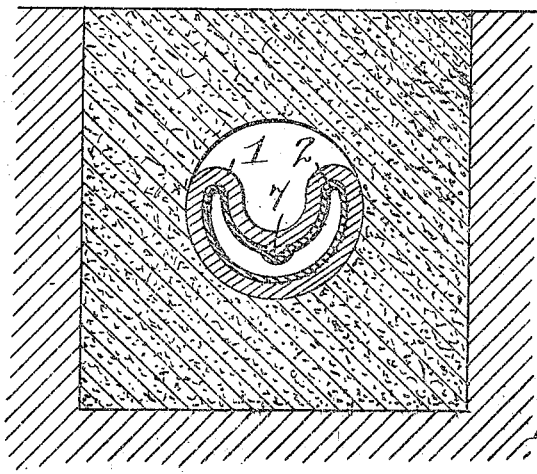
Witnesses
L. K. Basim
Jno. L. McCattrav
Inventor
F. J. Goldkamp
By T. E. Vrooman
his Attorney

UNITED STATES PATENT OFFICE.

FERDINAND J. GOLDKAMP, OF SAN DIEGO, CALIFORNIA, ASSIGNOR OF ONE-FOURTH TO ARTHUR G. NASON, OF SAN FRANCISCO, CALIFORNIA, AND ONE-FOURTH TO CHARLES W. OESTING, OF SAN DIEGO, CALIFORNIA.

DEVICE FOR THE MANUFACTURE OF HOLLOW OBJECTS.

934,666.

Specification of Letters Patent. Patented Sept. 21, 1909.

Application filed August 25, 1908. Serial No. 450,195.

*To all whom it may concern:*

Be it known that I, FERDINAND J. GOLD-KAMP, a citizen of the United States, residing at San Diego, in the county of San Diego and State of California, have invented certain new and useful Improvements in Devices for the Manufacture of Hollow Objects, of which the following is a specification, reference being had therein to the accompanying drawing.

This invention relates to the manufacture of hollow objects, such as pipes, tubes, or conduits or posts, columns, or cylinders having an internal bore.

The principle of the invention depends upon the capability of the inflated distensible body of flexible material to serve as a core or inner mold for a plastic material which is applied to the exterior thereof and allowed to indurate, the fluid pressure in the mold being subsequently released.

The object of the invention is to eliminate certain objections incident to the present constructions and methods of laying, and more particularly to avoid the presence of joints at frequent intervals, such as are found in conduits built up from short sections of previously manufactured tile or earthenware or other duct laid end to end in a trough or trench, to do away with the necessity for using manholes, junction-boxes, or short junction-sections where there is a sudden change of direction.

While my invention is applicable to conduits laid under ground or under water, it is also useful in making and laying or installing conduits in other situations, as, for instance, in the erection of hollow wall buildings, or retaining walls.

To the accomplishment of the recited object and others coördinate therewith, the preferred embodiment of my invention resides in that construction and arrangement of parts hereinafter described, illustrated in the accompanying drawings, and embraced within the scope of the appended claims.

In said drawings:—Figure I is a longitudinal section of the core. Fig. II is a transverse section of the core in a trench, ready for inflation, and Figs. III and IV are similar views, showing respectively, the core inflated and inclosed by concrete, and the core collapsed.

Similar numerals of reference indicate corresponding parts throughout the several views.

The core comprises, essentially, two parts, an outer tube (1) and an inner tube (2)—and first of the outer tube. This member is constructed preferably, of rubber, or like flexible material, and the terminals (3) thereof are considerably thicker than the remaining portion of the tube so as to insure reinforcement, and are tapered or pointed to facilitate the insertion and removal of the reinforcement, and are tapered or pointed terminal I clench, as at 4, an externally screw threaded collar (5), which is adapted to be engaged by the complementary internal screw threads of the cap (6).

Arranged longitudinally and on the inner portion of the tube (1) is a depending seam or projection (7), the function of which will presently appear. The inner tube (2), as this designation signifies, is inclosed by the tube (1), and conforms to the contour thereof, the corresponding pointed ends (8) being adapted to accommodate valves (9), which are opened or closed by the appropriate manipulation of the caps (6).

In the operation of the device, a bed of suitable material is provided, preferably, a layer of cement (10), in the trench (11), whereupon the core, in its collapsed condition, is positioned thereon as exhibited in Fig. II of the drawings. Either of the caps (6) is removed and the end of the core connected with a suitable fluid supply and the complete device distended by pressure. Additional cement is filled in or poured in around the core and permitted to harden, the internal pressure being maintained at such time to cause the core to be distended and serve as a mandrel for forming the bore of the conduit, as shown in Fig. III. This pressure may be maintained until the cement has set sufficiently to retain the form given to it by the distention of the core. When suitably hardened, the air or other distending fluid may be allowed to escape from the inner tube (2), thereby causing the core to collapse as shown in Fig. IV, this condition being accelerated by the preponderance of the longitudinal projection (7). It is obvious that either valve of the core may be used, and owing to the reinforced terminals the core may be inserted or removed without any liability of becoming ruptured.

It should be understood that in its broader aspect my invention comprehends the employment not only of the means described, but of equivalent means for performing the recited functions. While the arrangement shown is thought, at the present time, to be preferable, it is desired to reserve the right to effect such modifications and variations thereof as may come fairly within the scope of the appended claims.

What is claimed as new, is:—

1. A flexible, distensible, and collapsible core comprising an outer tube and an inner tube, means at each end of the inner tube for introducing and releasing fluid pressure, said outer tube having a longitudinal projection or seam, the preponderance of which is adapted to accelerate the collapsing of the core.

2. A flexible, distensible, and collapsible core having means at each end for introducing and releasing fluid pressure, said ends being contracted and presenting a gradual increase in thickness to serve as a reinforcement, and a correspondingly shaped cap detachably mounted on each of said ends.

In testimony whereof I hereunto affix my signature in presence of two witnesses.

FERDINAND J. GOLDKAMP.

Witnesses:
A. CLARK,
M. J. BALL.